US012559254B2

(12) United States Patent
Hashimoto

(10) Patent No.: US 12,559,254 B2
(45) Date of Patent: Feb. 24, 2026

(54) COMMODITIES AIRLIFTING SYSTEM AND METHOD OF AIRLIFTING COMMODITIES

(71) Applicant: KAWASAKI JUKOGYO KABUSHIKI KAISHA, Kobe (JP)

(72) Inventor: Yasuhiko Hashimoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 333 days.

(21) Appl. No.: 18/024,829

(22) PCT Filed: Sep. 1, 2021

(86) PCT No.: PCT/JP2021/032177
§ 371 (c)(1),
(2) Date: Mar. 6, 2023

(87) PCT Pub. No.: WO2022/050320
PCT Pub. Date: Mar. 10, 2022

(65) Prior Publication Data
US 2023/0312137 A1 Oct. 5, 2023

(30) Foreign Application Priority Data
Sep. 4, 2020 (JP) ................................. 2020-149452

(51) Int. Cl.
B64F 1/32 (2006.01)
B25J 5/00 (2006.01)
(52) U.S. Cl.
CPC ................ B64F 1/32 (2013.01); B25J 5/007 (2013.01); B65G 2814/0398 (2013.01)

(58) Field of Classification Search
CPC .... B64F 1/32; B65G 2814/0398; B25J 5/007; B65D 9/003
See application file for complete search history.

(56) References Cited

U.S. PATENT DOCUMENTS

| | | | | |
|---|---|---|---|---|
| 9,075,412 | B2 * | 7/2015 | Dixon .................. | G05D 1/0022 |
| 10,994,865 | B2 * | 5/2021 | Daw Perez ............. | B66F 9/063 |
| 2016/0332554 | A1 * | 11/2016 | Ambrosio ............ | B62D 55/065 |
| 2018/0217590 | A1 | 8/2018 | Kobayashi et al. | |
| 2020/0122834 | A1 | 4/2020 | Daw Perez et al. | |
| 2020/0122858 | A1 | 4/2020 | Daw Perez et al. | |
| 2020/0376677 | A1 | 12/2020 | Hibino | |
| 2021/0158280 | A1 | 5/2021 | Matsutani et al. | |
| 2022/0379792 | A1 * | 12/2022 | Wehner .................. | B66F 9/063 |
| 2023/0105528 | A1 * | 4/2023 | Wehner .................. | B66F 9/063 |
| | | | | 414/537 |

FOREIGN PATENT DOCUMENTS

| | | |
|---|---|---|
| JP | 2002-87535 A | 3/2002 |
| JP | 2016-533999 A | 11/2016 |
| JP | 2018-121267 A | 8/2018 |
| JP | 2021-86291 A | 6/2021 |
| KR | 10-2020-0066673 A | 6/2020 |
| WO | 2015/042587 A2 | 3/2015 |

* cited by examiner

*Primary Examiner* — Kaitlin S Joerger
(74) *Attorney, Agent, or Firm* — Oliff PLC

(57) ABSTRACT

A commodities airlifting system includes a self-propellable robot, an aircraft which carries commodities and the robot, and a lowering/loading apparatus which at least enables the robot to get off on the ground from the aircraft and to get on the aircraft from the ground, in a state where the aircraft is landed or a state where the aircraft is hovering. The robot which got off on the ground from the aircraft again gets on an aircraft.

20 Claims, 7 Drawing Sheets

BEFORE TAKING OFF

AFTER LANDING

COMMODITIES AIRLIFTING SYSTEM AND METHOD OF AIRLIFTING COMMODITIES

TECHNICAL FIELD

The present disclosure relates to a commodities airlifting system and a method of airlifting commodities.

CROSS-REFERENCE TO RELATED APPLICATION

This application claims the priority to Japanese Patent Application No. 2020-149452 filed on Sep. 4, 2020 with the Japan Patent Office, the entire contents of which are incorporated herein as a part of this application by reference.

BACKGROUND ART

In conventional commodities airlifting systems, for example, when airlifting cargo, cargos are loaded on a cargo aircraft at a departure location of the cargos, and the cargos are airlifted to a destination location of the cargos by the cargo aircraft. The airlifted cargos are then unloaded from the cargo aircraft at the destination location. The unloaded cargos are transported to a logistics base by a cargo vehicle etc. (for example, see FIG. 1 of Patent Document 1).

REFERENCE DOCUMENT(S) OF CONVENTIONAL ART

Patent Document

[Patent Document 1] JP2002-087535A (especially, FIG. 1)

DESCRIPTION OF THE DISCLOSURE

Meanwhile, at airports with few arrival-and-departure flights, since there is lots of idle time for the above-described operations, such as unloading of the cargos and transporting of the cargos to the logistics base, the organization which takes charge of this operation is bad in the efficiency.

Further, when airlifting disaster relief supplies to a disaster area, a supplier of the disaster relief supplies may need to perform operations, such as unloading of the relief supplies at the destination location of the cargo aircraft, and ground transport to a disaster site.

Moreover, at the destination location of the cargo aircraft, various operations may be needed in addition to the processing of the cargo and the relief supplies.

The present disclosure is made in order to solve the above problems, and one purpose thereof is to provide a commodities airlifting system and a method of airlifting commodities, which are capable of carrying out operation needed at a destination location of an aircraft.

In order to achieve the above-described purpose, a commodities airlifting system according to one aspect of the present disclosure includes a self-propellable robot, an aircraft which carries commodities and the robot, and a lowering/loading apparatus which at least enables the robot to get off on the ground from the aircraft and to get on the aircraft from the ground, in a state where the aircraft is landed or a state where the aircraft is hovering. The robot which got off on the ground from the aircraft again gets on an aircraft.

Further, a method of airlifting commodities according to another aspect of the present disclosure includes the steps of using a self-propellable robot, an aircraft which carries the commodities and the robot, and a lowering/loading apparatus which at least enables the robot to get off on the ground from the aircraft, and to get on the aircraft from the ground, in a state where the aircraft is landed or a state where the aircraft is hovering, and again getting on an aircraft the robot which got off on the ground from the aircraft.

Effect of the Disclosure

The present disclosure achieves an effect to provide the commodities airlifting system and the method of airlifting commodities, which are capable of carrying out operation needed at the destination location of the aircraft.

MODES FOR CARRYING OUT THE DISCLOSURE

Figure 1:
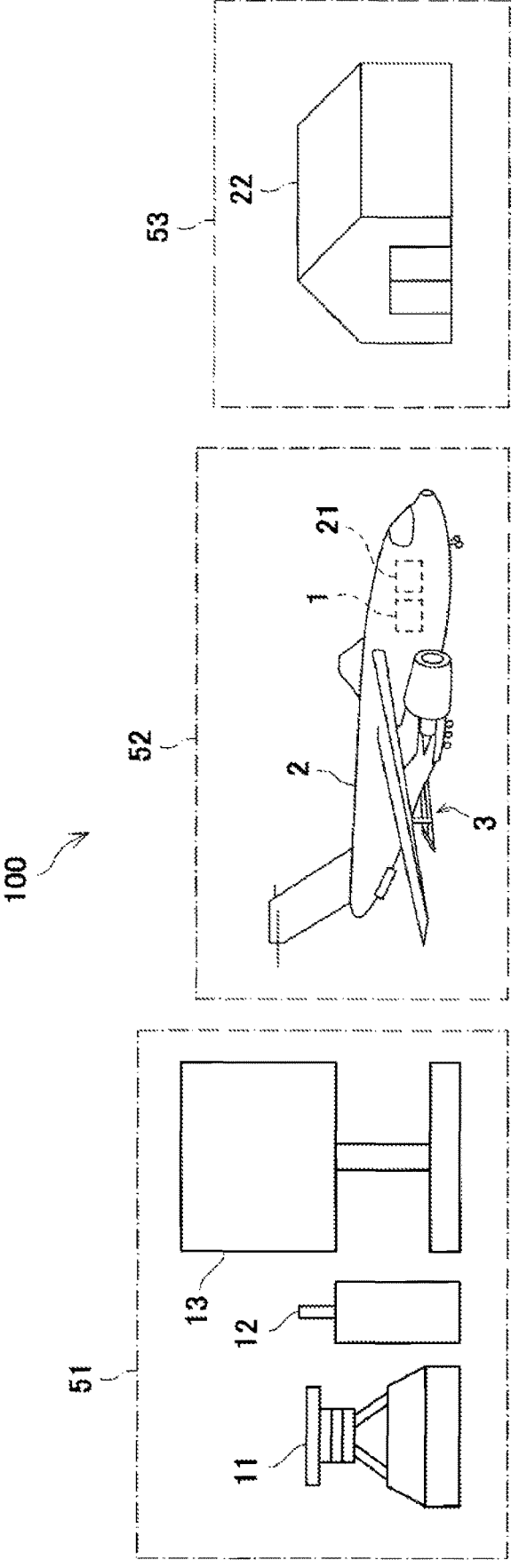
FIG. 1 is a schematic diagram illustrating one example of a configuration of hardware of a commodities airlifting system according to Embodiment 1 of the present disclosure.

Hereinafter, embodiments of the present disclosure are described with reference to the drawings. Below, the same reference characters are assigned to the same or corresponding elements throughout the drawings to omit redundant explanations. Further, since the following drawings are for explaining the present disclosure, elements unrelated to the present disclosure may be omitted, the dimension may not be exact because of an exaggeration etc., the drawings may be simplified, and the modes of mutually-corresponding elements may not match with each other in a plurality of drawings. Moreover, the present disclosure is not limited to the following embodiments.

Embodiment 1

FIG. 1 is a schematic diagram illustrating one example of a configuration of hardware of a commodities airlifting system according to Embodiment 1 of the present disclosure.

[Hardware Configuration]

Referring to FIG. 1, a commodities airlifting system 100 of Embodiment 1 is implemented over an operation area 51, an aircraft arrival area (first location) 52, and a purpose area (second location) 53.

The commodities airlifting system 100 includes a robot 1, an aircraft 2, and a robot lowering/loading apparatus 3. In FIG. 1, a state where the aircraft 2 which carries the robot 1 and commodities 21 is landed in the aircraft arrival area 52, and the robot lowering/loading apparatus 3 provided to the aircraft 2 is set (deployed) as a usable condition is illustrated.

Further, the commodities airlifting system 100 includes a robot operation unit 11, a drone operation unit 12, and a display unit 13, which are disposed in the operation area 51 as remote operation units. The operation area 51 can be set at arbitrary locations. For example, it may be set as any of the inside of the aircraft 2, the aircraft arrival area 52, the purpose area 53, and other locations remote from a departure location of the aircraft 2.

In the purpose area 53, a receiver's location 22 of the commodities 21 which are airlifted by the aircraft 2 is provided. The receiver's location 22 includes a logistics base, a receiver's location of relief supplies in a disaster area, etc.

Figure 4:
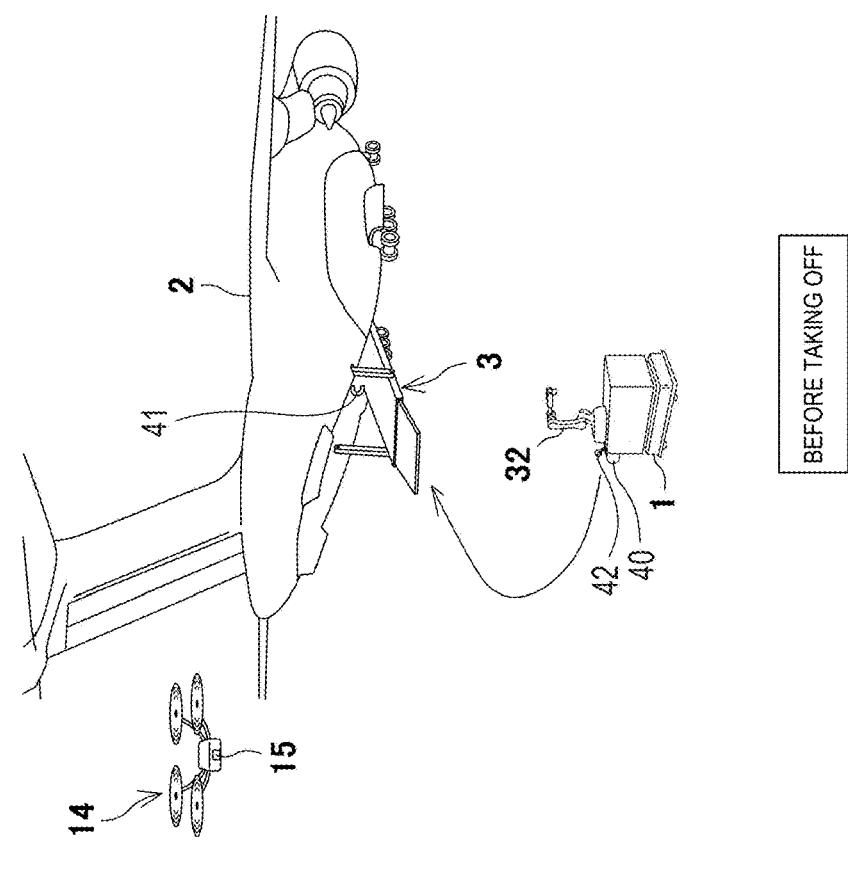
FIG. 4 is a perspective view illustrating operation of the commodities airlifting system in FIG. 1.
Figure 4:
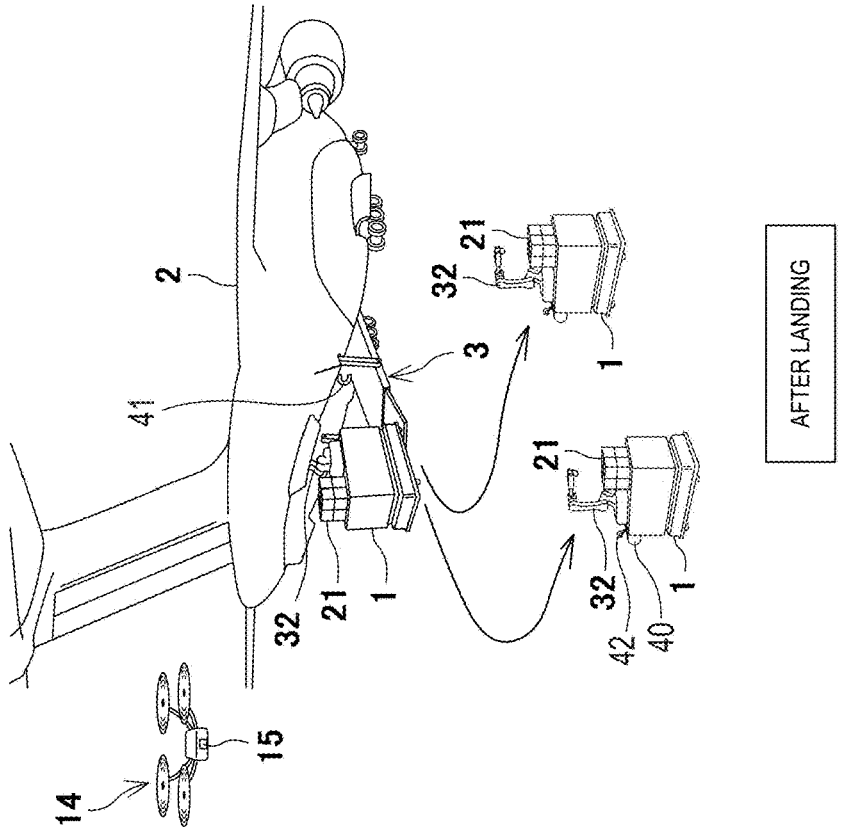

Further, the commodities airlifting system 100 includes a drone 14 where an imaging unit 15 is mounted (see FIG. 4). The drone 14 is transported by the aircraft 2 along with the robot 1 (not illustrated in FIG. 1).

Below, these elements are described in detail.

<Commodities 21>

Examples of the commodities 21 include one or more cargos, baggage, relief supplies, etc.

<Aircraft 2>

Examples of the aircraft 2 include a fixed-wing aircraft and a rotary-wing aircraft (or a helicopter). When the aircraft 2 is classified according to its use, it includes a cargo aircraft for private sectors, a military cargo aircraft, a passenger plane, etc. In Embodiment 1, the aircraft 2 is a cargo aircraft, for example. A mode in which the aircraft 2 is a helicopter is illustrated in Embodiment 2 which will be described later.

<Robot Lowering/Loading Apparatus 3>

The robot lowering/loading apparatus 3 may be any device as long as it allows the robot 1 to get off from the aircraft 2 onto the ground (unload), and to get on the aircraft 2 from the ground (load), in a state where the aircraft 2 is landed or is hovering. The robot lowering/loading apparatus 3 may be disposed at the aircraft 2 or the robot 1, or may be disposed separately from these. Here, the robot lowering/loading apparatus 3 is disposed at the aircraft 2. In detail, the robot lowering/loading apparatus 3 is configured as follows.

Referring to FIG. 4, an opening is formed in a lower surface of a rear part of a fuselage of the aircraft 2, and a pair of side surface doors and a lower surface door which open and close the opening while swinging are disposed. The pair of side surface doors extend leftward and rightward of the fuselage, respectively, and they are configured to swing vertically centering on left and right base-end parts. The lower surface door extends in the rear direction of the fuselage, and is configured to swing vertically centering on a base-end part forward thereof. An inner surface of the lower surface door is formed in a flat surface so that a vehicle including the robot 1 can travel, and when the lower surface door is opened and a tip end thereof contacts the ground surface, the vehicle including the robot 1 becomes able to travel on the inner surface of the lower surface door. The opening is closed by the pair of side surface doors and the lower surface door during a flight. Therefore, the pair of side surface doors and the lower surface door constitute the robot lowering/loading apparatus 3.

<Robot 1>

Figure 2:
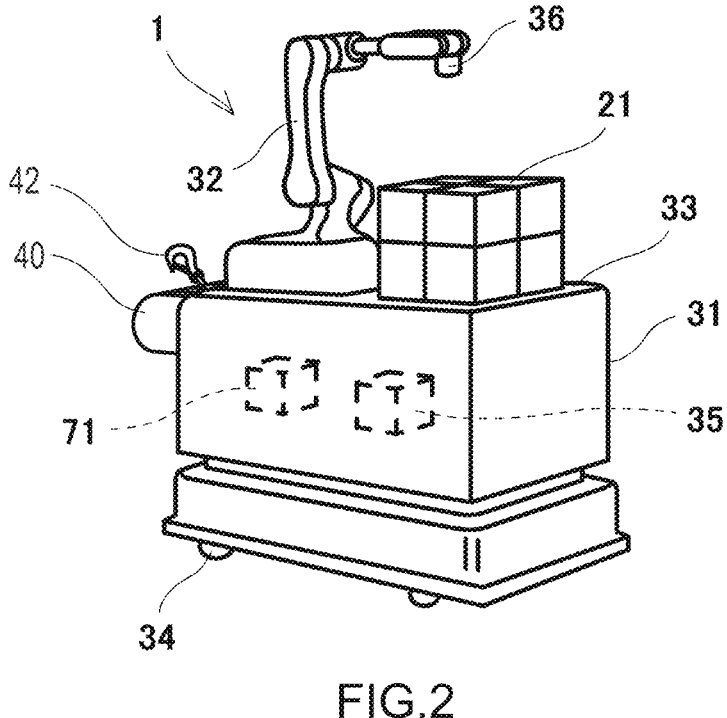
FIG. 2 is a perspective view illustrating one example of a configuration of a robot in FIG. 1.

FIG. 2 is a perspective view illustrating one example of a configuration of the robot 1 in FIG. 1. Referring to FIG. 2, the robot 1 may be any robot as long as it is configured to be self-propellable, configured to include a placing part 33 where the commodities 21 are placed, and configured so that the commodities 21 are placeable on the placing part 33 and the commodities 21 placed on the placing part 33 are removable from the placing part.

In detail, the robot 1 includes a cart 31, for example. Wheels 34 are disposed at a base part of the cart 31. A robotic arm 32 is disposed at one of end parts of an upper surface of the cart 31. For example, the robotic arm 32 includes a vertical articulated arm of six degrees of freedom (six axes), and a suction part 36 is attached to a tip end thereof as an end effector. The end effector can be selected suitably according to the use of the robotic arm 32.

The remaining part of the upper surface of the cart 31 is constituted as the placing part 33. The placing part 33 includes a fence etc. (not illustrated) for preventing a collapse of cargo piles of the loaded commodities 21.

The robot 1 further includes a robot control unit 71 and a power source 35. The robot control unit 71 controls operation of the robot 1. The power source 35 is comprised of a rechargeable battery, a fuel cell, and/or an internal combustion engine, for example. If the power source 35 is comprised of an internal combustion engine, a generator is disposed as a power supply. Here, the power source 35 is a rechargeable battery.

The robot 1 locks the robotic arm 32 at a given posture in an idle state, and unlocks it when started.

<Imaging Unit 15>

FIG. 4 is a perspective view illustrating operation of the commodities airlifting system 100 in FIG. 1. Referring to FIG. 4, the imaging unit 15 is a device for imaging the circumference of the robot 1. The imaging unit 15 includes a camera. The camera includes a two-dimensional camera, a three-dimensional camera, an infrared camera, etc.

Here, although the imaging unit 15 is disposed at the drone 14, it may disposed at a suitable location of the robot 1 or the aircraft 2. Further, the imaging unit 15 may be disposed at a support which is installed on the ground. The number of imaging units 15 is not limited. The installation mode of the imaging unit 15 may be a combination of these different installation modes.

<Drone 14>

Referring to FIG. 4, the drone 14 is not limited in particular. The drone 14 is preferably of a type with an autonomous-flight capability. Here, although the drone 14 is disposed corresponding to the robot 1 one on one (1:1), a plurality of drones may be disposed corresponding to a single robot 1 (plural:1).

<Robot Operation Unit 11>

Referring to FIG. 1, an upper end part of the robot operation unit 11 is constituted as a grip part for an operator, and when the operator moves and operates the grip part, the suction part 36 of the robotic arm 32 of the robot 1 moves according to the moving operation. Further, the grip part includes an operation part of the cart 31, and the operator can control traveling of the cart 31 by operating this operation part.

<Drone Operation Unit 12>

For example, the drone operation unit 12 includes a joystick which can be pushed and pulled, and can be tilted, and when the operator pushes, pulls, and/or tilts the joystick, the drone moves according to this operation. Further, the drone operation unit 12 includes an operation part of the imaging unit 15, and the operator can control operation (on/off, zoom, etc.) of the imaging unit 15 by operating this operation part.

<Display Unit 13>

For example, the display unit 13 is comprised of a liquid crystal display. The display unit 13 displays an image captured by the imaging unit 15.

[Configuration of Control System]

Figure 3:
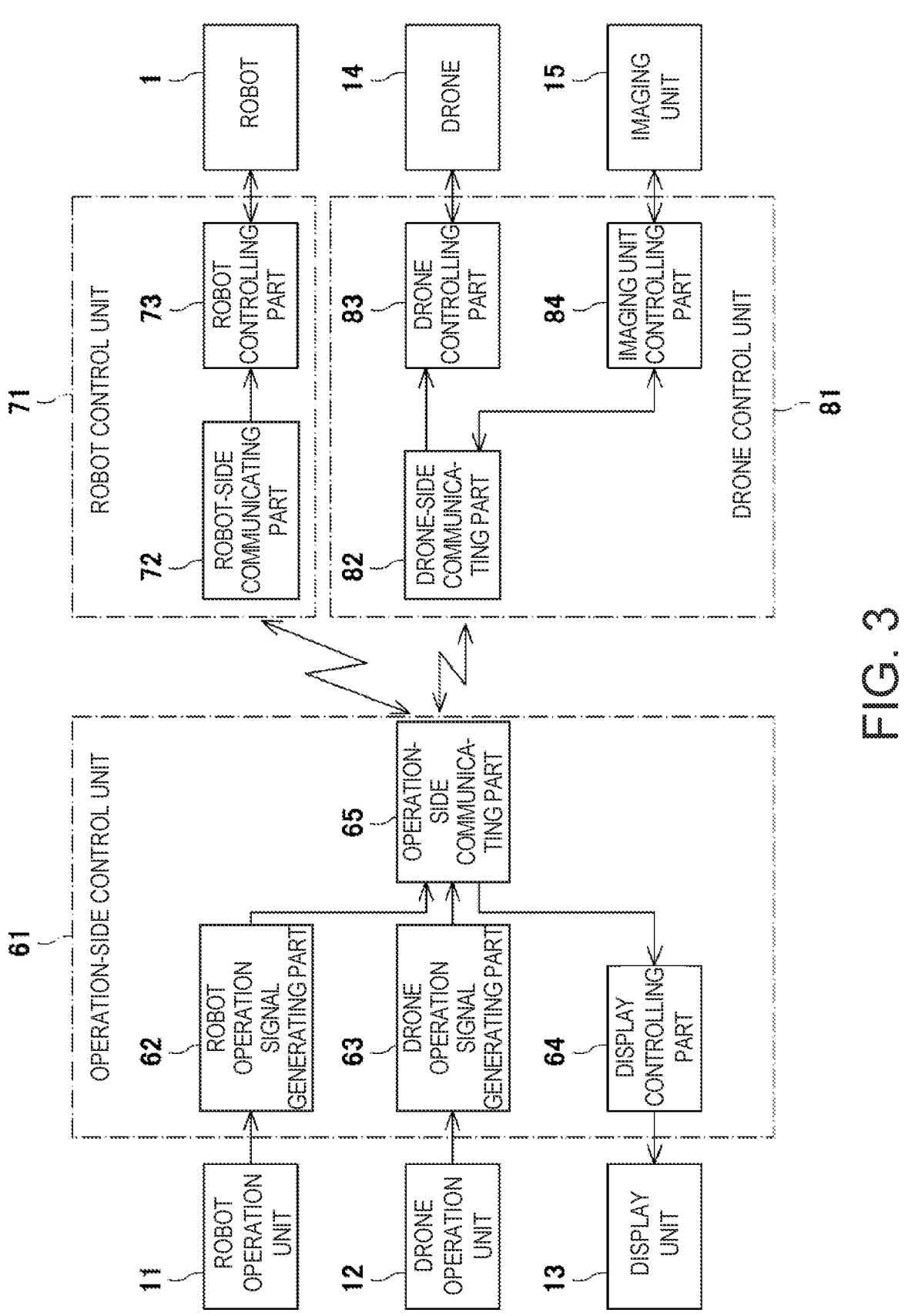
FIG. 3 is a functional block diagram illustrating one example of a configuration of a control system of the commodities airlifting system according to Embodiment 1 of the present disclosure.

FIG. 3 is a functional block diagram illustrating one example of a configuration of a control system of the commodities airlifting system according to Embodiment 1 of the present disclosure.

Referring to FIG. 3, the commodities airlifting system 100 includes an operation-side control unit 61, a robot control unit 71, and a drone control unit 81.

The operation-side control unit 61 includes a robot operation signal generating part 62, a drone operation signal generating part 63, a display controlling part 64, and an operation-side communicating part 65. The operation-side communicating part 65 is comprised of a communications apparatus which has a data communication capability. The robot operation signal generating part 62, the drone operation signal generating part 63, and the display controlling part 64 are comprised of a computing element having a processor and a memory. These are, in the computing element, functional blocks realized by the processor executing a control program stored in the memory. In detail, the computing element is comprised of a microcontroller, an MPU, an FPGA (Field Programmable Gate Array), and a PLC (Programmable Logic Controller), for example. These may be comprised of a sole computing element which performs a centralized control, or may be comprised of a plurality of computing elements which perform a distributed control.

The robot operation signal generating part 62 generates a robot operation signal according to operation of the robot operation unit 11. The drone operation signal generating part 63 generates a drone operation signal according to operation of the drone operation unit 12. The display controlling part 64 displays on the display unit 13 an image according to an image signal transmitted from the operation-side communicating part 65. The operation-side communicating part 65 converts the robot operation signal transmitted from the robot operation signal generating part 62, and the drone operation signal transmitted from the drone operation signal generating part 63 into a wireless-communication signal, and wirelessly transmits the signal. The operation-side communicating part 65 receives a wireless-communication signal transmitted from a drone-side communicating part 82, converts it into an image signal, and transmits it to the display controlling part 64.

The robot control unit 71 includes a robot-side communicating part 72 and a robot controlling part 73. The robot-side communicating part 72 is comprised of a communications apparatus with a data-communication capability. The robot controlling part 73 is comprised of a computing element having a processor and a memory. The robot controlling part 73 is a functional block in the computing element, which is realized by the processor executing a control program stored in the memory. In detail, the computing element is comprised of a microcontroller, an MPU, an FPGA (Field Programmable Gate Array), and a PLC (Programmable Logic Controller), for example. These may be comprised of a sole computing element which performs a centralized control, or may be comprised of a plurality of computing elements which perform a distributed control.

The robot-side communicating part 72 receives a wireless-communication signal transmitted from the operation-side communicating part 65, converts it into a robot operation signal, and transmits it to the robot controlling part 73. The robot controlling part 73 controls operation of the robot 1 according to the robot operation signal.

The drone control unit 81 includes the drone-side communicating part 82, a drone controlling part 83, and an imaging unit controlling part 84. The drone-side communicating part 82 is comprised of a communications apparatus with a data-communication capability. The drone controlling part 83 and the imaging unit controlling part 84 are comprised of a computing element having a processor and a memory. The drone controlling part 83 and the imaging unit controlling part 84 are functional blocks in the computing element, which are realized by the processor executing a control program stored in the memory. In detail, the computing element is comprised of a microcontroller, an MPU, an FPGA (Field Programmable Gate Array), and a PLC (Programmable Logic Controller), for example. These may be comprised of a sole computing element which performs a centralized control, or may be comprised of a plurality of computing elements which perform a distributed control.

The drone-side communicating part 82 receives a wireless-communication signal transmitted from the operation-side communicating part 65, converts it into a drone operation signal, and transmits it to the drone controlling part 83 and the imaging unit controlling part 84. Further, the drone-side communicating part 82 converts the image signal transmitted from the imaging unit controlling part 84 into a wireless-communication signal, and wirelessly transmits it. The drone controlling part 83 controls operation of the drone 14 according to the drone operation signal transmitted from the drone-side communicating part 82. The imaging unit controlling part 84 controls operation of the imaging unit 15 according to the drone operation signal transmitted from the drone-side communicating part 82 (among them, the imaging unit operation signal). Further, the imaging unit controlling part 84 transmits the image signal transmitted from the imaging unit 15 to the drone-side communicating part 82.

Here, the function of the element disclosed herein can be performed using circuitry or processing circuitry including a general-purpose processor, a dedicate processor, an integrated circuit, an ASIC (Application Specific Integrated Circuits), a conventional circuit, and/or a combination thereof, which is configured or programmed so as to execute the disclosed function. Since the processor includes transistors and other circuitry, it is considered to be the processing circuitry or the circuitry. In the present disclosure, "unit" (including the computing element) or "part" is hardware which performs listed functions, or hardware which is programmed to perform the listed functions. The hardware may be hardware disclosed herein, or may be other known hardware which are programmed or configured to perform the listed functions. If the hardware is a processor considered to be a kind of circuitry, "unit" (including the computing element) or "part" is a combination of hardware and software, and the software is used for a configuration of the hardware and/or the processor.

[Operation of Commodities Airlifting System 100 (Method of Airlifting Commodities)]

Next, operation of the commodities airlifting system 100 configured as described above (a method of airlifting commodities) is described with reference to FIGS. 1 to 4.

Referring to FIGS. 1 to 4, the commodities 21, the robot 1, and the drone 14 are loaded on the aircraft 2. The robot 1 locks the robotic arm 32. The commodities 21 may be loaded onto the robot 1, or may be loaded onto the aircraft 2 separately from the robot 1. Here, the commodities 21 are loaded separately from the robot 1. Here, a plurality of robots 1 are loaded. The robots 1 and the drones 14 correspond to each other on the one-on-one basis (1:1), as illustrated in FIG. 3. That is, while one operator looks at the image of the display unit 13, he/she operates the robot 1 and the drone (and the imaging unit 15) via the robot operation unit 11 and the drone operation unit 12, respectively. Below, operation of the commodities airlifting system 100 (the method of airlifting commodities) is described using one of the robots 1 as an example.

When the aircraft 2 lands in the aircraft arrival area 52, the pair of side surface doors and the lower surface door which constitute the robot lowering/loading apparatus 3 open so that the robot 1 can travel.

First, the operator starts the robot 1. Therefore, the lock of the robotic arm 32 is unlocked. Next, the drone 14 is located at a suitable location inside the aircraft 2, and the robotic arm 32 loads the commodities 21 onto the robot 1. Next, the operator makes the robot 1 move outside the aircraft through the robot lowering/loading apparatus 3, while making the drone 14 move outside the aircraft. Then, the robot 1 is moved to the receiver's location 22 of the purpose area 53, along with the drone 14. Then, at the receiver's location 22, the operator makes the robotic arm 32 unload the commodities 21 from the robot 1 to a given location. Then, if there is any operation needed, the operation is performed using the robot 1.

When the operation is completed, the operator moves the robot 1 and the drone 14 to the aircraft arrival area 52. Then, the operator loads the robot 1 onto the aircraft 2 through the robot lowering/loading apparatus 3, along with the drone 14 (especially, see FIG. 4). Then, when the operator stops the operation of the robot 1, the robot 1 locks the robotic arm 32.

Then, the aircraft 2 closes the pair of side surface doors and the lower surface door which constitute the robot lowering/loading apparatus 3, and takes off.

Modification 1

Figure 5A:
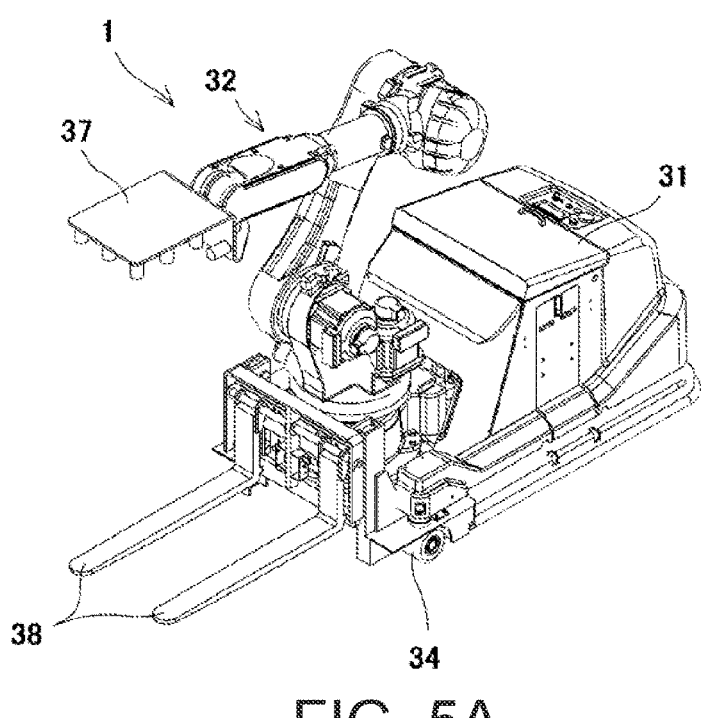
FIG. 5A is a perspective view illustrating another example of the configuration of the robot in FIG. 1.
Figure 5B:
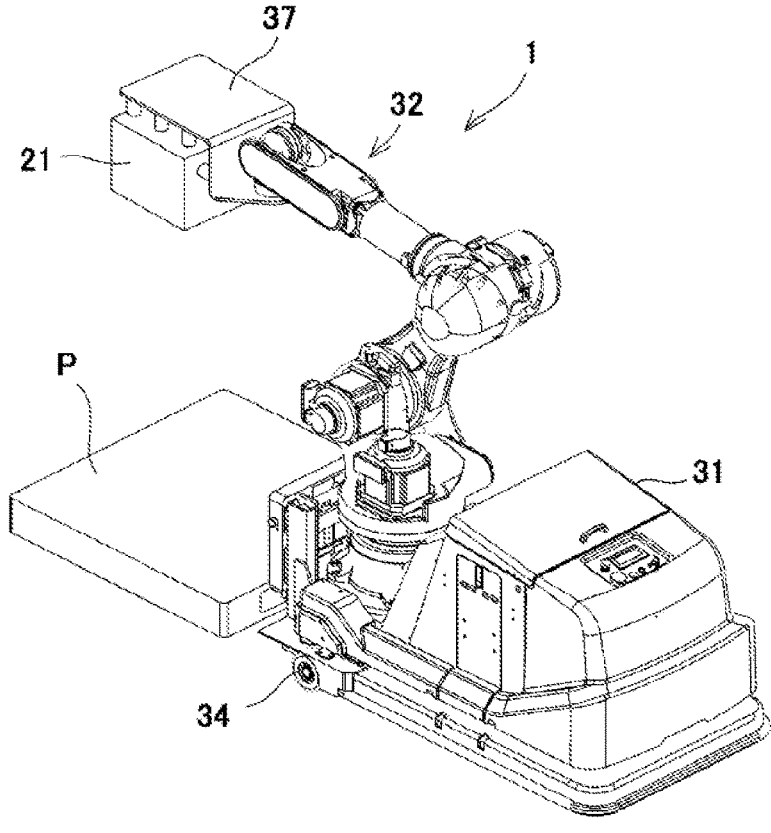
FIG. 5B is a perspective view illustrating another example of the configuration of the robot in FIG. 1.

FIGS. 5A and 5B are perspective views illustrating another example of the configuration of the robot 1 in FIG. 1. Referring to FIGS. 5A and 5B, in Modification 1, a robot 1 illustrated in FIGS. 5A and 5B is used, instead of the robot 1 illustrated in FIG. 2.

As compared with the robot 1 in FIG. 1, in this robot 1, the cart 31 further includes a lift 38. A pallet P is placed on the lift 38, and the commodities 21 are placed on the pallet P by the robotic arm 32. Therefore, this lift 38 constitutes the placing part of the commodities 21. The robotic arm 32 holds the commodities 21 by a suction part 37.

Modification 2

In Modification 2, the robot 1 only performs a given operation at the receiver's location 22, without transporting the commodities 21 to the receiver's location 22. As the given operation, the robot 1 transports a package at the receiver's location 22 to a required location, for example.

Embodiment 2

Figure 6:
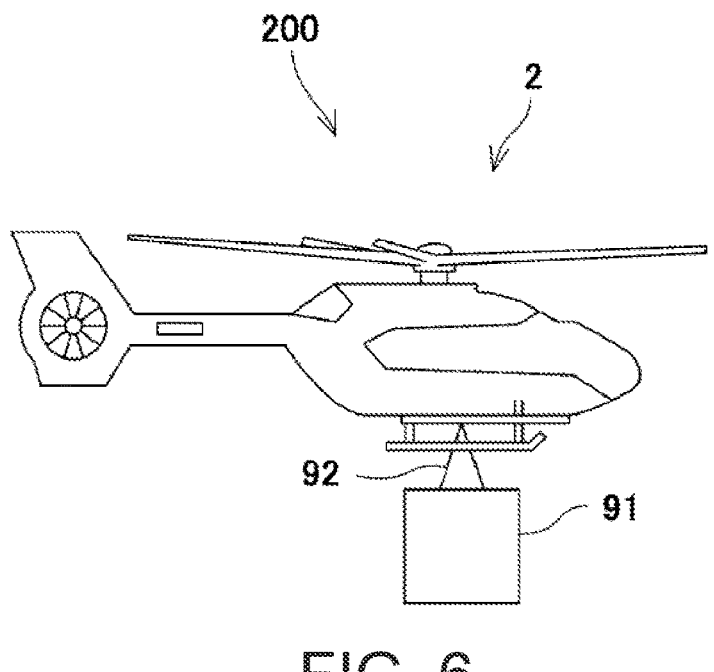
FIG. 6 is a schematic diagram illustrating one example of a configuration of a commodities airlifting system according to Embodiment 2 of the present disclosure.
Figure 7:
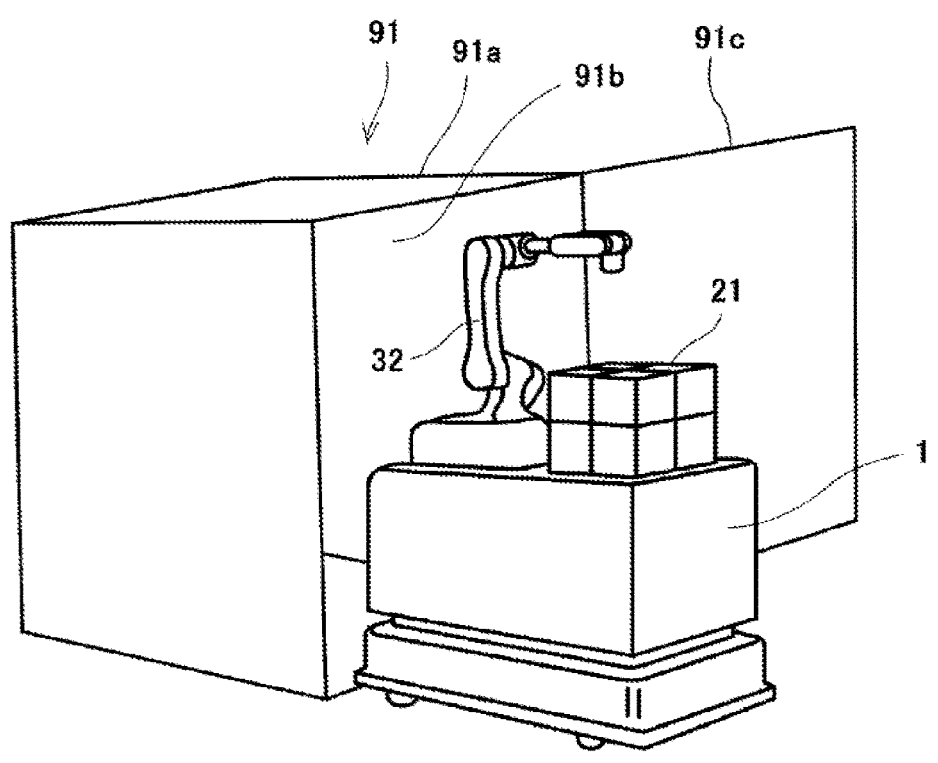
FIG. 7 is a perspective view illustrating operation of a container and a robot in FIG. 6.

FIG. 6 is a schematic diagram illustrating one example of a configuration of a commodities airlifting system 200 according to Embodiment 2 of the present disclosure. FIG. 7 is a perspective view illustrating operation of a container 91 and the robot 1 in FIG. 6. In FIG. 7, for simplification, the thickness of the walls of the container 91 is omitted, and illustration of a drive mechanism of a door 91c is omitted. Further, in FIG. 7, illustration of a wire 92 of a winch to which the container 91 is attached is omitted.

Referring to FIG. 6, the commodities airlifting system 200 in Embodiment 2 is different from the commodities airlifting system 100 of Embodiment 1 in the following, and the rest is the same as that of the commodities airlifting system 100 of Embodiment 1. Below, the difference is described.

In the commodities airlifting system 200 of Embodiment 2, the aircraft 2 is a transport helicopter, and the robot 1, the commodities 21, and the drone 14 (not illustrated in FIGS. 6 and 7) are stored and transported in the container 91 which is suspended from the aircraft 2.

The aircraft 2 includes the winch (not illustrated) which winds up and unwinds (sends out or draws) the wire 92, and the container 91 is attached to a tip-end part of the wire 92. The aircraft 2 raises and lowers the container 91 by the winch winding up and unwinding the wire 92. Therefore, the winch (wire 92) and the container 91 constitute the robot lowering/loading apparatus 3.

Referring to FIG. 7, the container 91 includes a main body 91a comprised of a rectangular parallelepiped box, and the door 91c, for example. The main body 91a has an opening 91b entirely in one of the side surfaces, and the door 91c is disposed at a side edge of the opening 91b so that it swings in the left-and-right direction to open and close the opening 91b. The door 91c can be opened and closed by an aviator of the aircraft 2 operating a given operation part.

Referring to FIG. 6, in Embodiment 2, the robot 1 is stored together with the drone 14 in a state where the commodities 21 are loaded. Then, the container 91 is attached to a tip end of the wire 92 of the winch of the aircraft 2, and is suspended by the aircraft 2, when the aircraft 2 takes off.

Referring to FIGS. 1, 6, and 7, when the aircraft 2 reaches above the aircraft arrival area 52, it hovers and makes the winch unwind the wire 92 to lower the container 91 on the ground. Then, when the aviator of the aircraft 2 operates the given operation part, the door 91c of the container 91 opens.

Referring to FIG. 7, when the door 91c of the container 91 opens, the operator starts the robot 1 and the drone 14. Operation of the robot 1 and the drone 14 thereafter is the same as that of the commodities airlifting system 100 of Embodiment 1. Therefore, the explanation is omitted.

Embodiment 3

In Embodiment 3, the robot 1 in either of Embodiment 1 (including Modifications 1 and 2) and Embodiment 2 is program-controlled. In this case, the drone operation unit 12, the display unit 13, and the drone 14 are omitted.

When the operation to be achieved by the robot 1 is easy, Embodiment 3 is especially effective.

Other Embodiments

In either of Embodiment 1 (including Modifications 1 and 2) and Embodiment 2, in the aircraft arrival area 52, the aircraft 2 from which the robot 1 comes down on the ground may differ from the aircraft 2 to which the grounded robot 1 comes up.

In either of Embodiment 1 (including Modifications 1 and 2) and Embodiment 2, if the robot 1 travels the rough terrain, the wheel part of the cart 31 may be comprised of a crawler, instead of the wheels 34.

In either of Embodiment 1 (including Modifications 1 and 2) and Embodiment 2, the robot 1 and the aircraft 2 may be configured so that the robot 1 gets on and gets off the aircraft 2 by itself. In detail, they may be configured as follows.

Figure 8:
FIG. 8 is a view illustrating operation of the robot with respect to an aircraft.

For example, as shown in FIG. 8 and also in part in FIGS. 2 and 4, the robot 1 includes a winch 40 at a suitable location thereof, and an opening 43 through which the robot 1 passes is formed in a lower surface of the aircraft 2. This opening 43 is formed in such a part of the aircraft 2 that, when the robot 1 gets off on the ground, it can fold up the robotic arm 32 and passes through between the lower surface of the aircraft 2 and the ground surface. A hooked part 41 for the hook 42 at the tip end of the wire of the winch is disposed at a suitable location around the opening 43. This hooked part 41 is disposed at a position where, when the robot 1 gets off on the ground, the suction part 36 can reach while the robotic arm 32 is extended. The robot 1 uses the suction part 36 to engage the hook 42 with the hooked part 41, passes through the opening 43 by using the winch 40 and gets on the ground, and then uses the suction part 36 to release the hook 42 from the booked part 41. On the other hand, when getting on the aircraft 2, the robot 1 extends the robotic arm 32 from the ground, and uses the suction part 36 to engage the hook 42 of the wire of the winch 40 with the hooked part. Then, it uses the winch 40 to pass through the opening 43 and get on the aircraft 2, and uses the suction part 36 to release the hook 42 from the hooked part 41. Thus, the robot 1 can get off from the aircraft 2 and can get on the aircraft 2 by itself. Note that, if the winch 40 and the hooked part 41 corresponding thereto are disposed at three or more parts horizontally around the center of gravity of the robot 1, the posture of the robot 1 can be stabilized.

It is apparent for the person skilled in the art that many improvements and other embodiments are possible from the above description. Therefore, the above description is to be interpreted only as illustration.

(Operation and Effects of Disclosure)

The commodities airlifting systems 100, 200 according to one aspect of the present disclosure include the self-propellable robot 1, the aircraft 2 which can carry the commodities 21 and the robot 1, and the lowering/loading apparatus 3 which at least enables the robot 1 to get off from the aircraft 2 on the ground and get on the aircraft 2 from the ground. The robot 1 which got off from the aircraft 2 on the ground again gets on the aircraft 2.

Here, examples of the "aircraft 2" include a fixed-wing aircraft and a rotary-wing aircraft (or a helicopter). When the "aircraft 2" is classified according to its use, it includes a cargo aircraft for private sectors, a military cargo aircraft, a passenger plane, etc.

Examples of the "commodities 21" include one or more cargos, baggage, relief supplies, etc.

The term "get on" means both a case of storing the to-be-loaded object inside the aircraft and a case of attaching the to-be-loaded object externally to the aircraft.

The mode in which the to-be-loaded object is attached externally to the aircraft 2 includes a mode in which the to-be-loaded object is suspended from the aircraft 2, a mode in which the to-be-loaded object is fixed to the aircraft 2 with a fixture, etc.

The phrase "the robot 1 gets off" means both a case of the robot 1 getting off by itself using the lowering/loading apparatus 3, and a case of the robot 1 being lowered by the lowering/loading apparatus 3. The phrase "the robot 1 gets on" means both a case of the robot 1 getting on by itself using the lowering/loading apparatus 3, and a case of the robot 1 being loaded by the lowering/loading apparatus 3.

The phrase "the robot 1 again gets on the aircraft 2" means that the aircraft 2 from which the robot 1 gets off may be the same as or may be different from the aircraft 2 to which the robot 1 is again loaded.

According to this configuration, the commodities 21 can be transported to the logistics base on the ground by the robot 1 getting off on the ground from the aircraft 2 while it is loaded on itself with the commodities 21, or loading itself with the commodities 21 loaded on the aircraft 2 after it got off on the ground, and being self-propelled. Further, various operations needed at the destination location of the aircraft 2 can be achieved by suitably selecting the structure of the robot 1 and the type of the end effector. Further, the robot 1 which came down on the ground from the aircraft 2 is again loaded onto the aircraft 2. Therefore, the operation needed at the destination location of the aircraft 2 can be achieved.

The robot 1 may be configured so that it takes out the commodities 21 from the aircraft 2 in a state where the aircraft is landed at the first location 52 or a state where the aircraft is hovering above the first location 52, then transports the taken-out commodities 21 to the second location 53 distant from the first location 52 by being self-propelled, and puts the transported commodities 21 on the second location 53.

According to this configuration, by selecting a point where the commodities 21 are needed as the second location 53, the robot 1 can take out the commodities 21 from the aircraft 2, and deliver the commodities 21 to the point where they are needed.

The robot 1 may be configured so that it locks itself in a state where it is carried on the aircraft 2, and when it gets off from the aircraft 2, it unlocks by itself, and then is self-propelled.

According to this configuration, the robot 1 can safely be transported during an outward trip, and can easily be self-propelled after the transportation.

The robot 1 may be configured to lock itself after it gets on the aircraft 2, or to get on the aircraft 2 after it locks itself.

According to this configuration, the robot 1 can safely be transported during a return trip.

The robot 1 may be configured so that it is self-propelled to a given operation location, and performs a work at the operation location.

According to this configuration, the robot 1 can carry out the operation needed at the destination location of the aircraft 2 as the given operation.

The robot 1 may include the placing part 33 where the commodities 21 are to be placed, and the part of the robot 1 which handles the commodities 21 may be configured to place the commodities 21 on the placing part 33 and remove from the placing part 33 the commodities 21 placed on the placing part 33.

According to this configuration, the robot 1 can load onto its own placing part 33 the commodities 21 loaded onto the aircraft 2, by using the part which handles the commodities 21 (for example, the robotic arm 32 in which the end effector is attached to the tip end thereof), and after self-propelled, the part which handles the commodities 21 can unload the commodities 21 from the placing part 33 to the destination.

The commodities airlifting systems 100, 200 may further include a remote operation unit (11) for the operator to remotely operate the robot 1.

According to this configuration, the operator can remotely operate the robot 1.

The commodities airlifting systems 100, 200 may further include the imaging unit 15 which images the situation around the robot 1, and the display unit 13 which displays the image captured by the imaging unit 15 to the operator.

According to this configuration, the operator can remotely operate the robot 1, while looking at the image of the situation around the robot 1 which is displayed on the display unit 13.

The robot 1 may be configured to be program-controlled.

According to this configuration, the robot 1 can be operated automatically.

The commodities 21 may be one or more cargos, baggage, and relief supplies.

According to this configuration, one or more cargos, baggage, or relief supplies can be delivered to the location where the one or more cargos, baggage, or relief supplies are needed, by the air transport by the aircraft 2 and the ground transport by the robot 1.

Further, a method of airlifting commodities according to another aspect of the present disclosure includes using the self-propellable robot 1, the aircraft 2 which can carry the commodities 21 and the robot 1, and the lowering/loading apparatus 3 which at least enables the robot 1 to get off on the ground from the aircraft 2, and to get on the aircraft 2 from the ground, in a state where the aircraft 2 is landed or a state where the aircraft 2 is hovering, and again getting on an aircraft 2 the robot 1 which got off on the ground from the aircraft 2.

According to this configuration, the operation needed at the destination location of the aircraft 2 can be achieved.

The invention claimed is:

1. A commodities airlifting system, comprising:
a self-propellable robot;
an aircraft that carries commodities and the robot; and
a lowering/loading apparatus that at least enables the robot to get off on the ground from the aircraft and to get on the aircraft from the ground, in a state where the aircraft is landed or a state where the aircraft is hovering,
wherein the robot that got off on the ground from the aircraft again gets on an aircraft, and
wherein the robot comprises a winch, a suction part and a hook, the suction part positioned to reach a hooked part disposed around an opening of the aircraft and configured to engage the hook with the hooked part, the winch configured to pass the robot through the opening and the suction part configured to release the hook from the hooked part, thereby allowing the robot to get off on the ground from the aircraft by itself.

2. The commodities airlifting system of claim 1, wherein the robot takes out the commodities from the aircraft in a state where the aircraft is landed at a first location or a state where the aircraft is hovering above the first location, then transports the taken-out commodities to a second location distant from the first location by being self-propelled, and puts the transported commodities on the second location.

3. The commodities airlifting system of claim 1, wherein the robot comprises a robot arm configured to load the commodities onto the aircraft, and the robot locks, by itself, the robot arm in a state where the robot is carried on the aircraft, and when the robot gets off from the aircraft, the robot unlocks by itself, and then is self-propelled.

4. The commodities airlifting system of claim 1, wherein the robot locks by itself after the robot gets on the aircraft, or the robot gets on the aircraft after the robot locks by itself.

5. The commodities airlifting system of claim 1, wherein the robot is self-propelled to a given operation location, and performs a work at the operation location.

6. The commodities airlifting system of claim 1, wherein the robot includes a placing part where the commodities are to be placed, and
wherein a part of the robot that handles the commodities places the commodities on the placing part, and removes from the placing part the commodities placed on the placing part.

7. The commodities airlifting system of claim 1, further comprising a remote operation unit for an operator to remotely operate the robot.

8. The commodities airlifting system of claim 7, further comprising an imaging unit that images a situation around the robot; and a display unit that displays the image captured by the imaging unit to the operator.

9. The commodities airlifting system of claim 1, wherein the robot is program-controlled.

10. The commodities airlifting system of claim 1, wherein the commodities include a cargo, baggage, or relief supplies.

11. A method of airlifting commodities, comprising the steps of:
using a self-propellable robot, an aircraft that carries the commodities and the robot, and a lowering/loading apparatus that at least enables the robot to get off on the ground from the aircraft, and to get on the aircraft from the ground, in a state where the aircraft is landed or a state where the aircraft is hovering, wherein the robot comprises a winch, a suction part and a hook, the suction part positioned to reach a hooked part disposed around an opening of the aircraft, the robot getting off on the ground by itself by the suction part engaging the hook with the hooked part, the winch passing the robot through the opening and the suction part then releasing the hook from the hooked part; and
again getting on an aircraft the robot that got off on the ground from the aircraft.

12. The method of claim 11, comprising the steps of:
taking out, by the robot, the commodities from the aircraft in a state where the aircraft is landed at a first location or a state where the aircraft is hovering above the first location;
then transporting, by the robot being self-propelled, the taken-out commodities to a second location distant from the first location; and
putting, by the robot, the transported commodities on the second location.

13. The method of claim 11, wherein the robot comprises a robot arm configured to load the commodities onto the aircraft, and the robot locks, by itself, the robot arm in a state where the robot is carried on the aircraft, and when the robot gets off from the aircraft, the robot unlocks by itself, and then is self-propelled.

14. The method of claim 11, wherein the robot locks by itself after the robot gets on the aircraft, or the robot gets on the aircraft after the robot locks by itself.

15. The method of claim 11, wherein the robot is self-propelled to a given operation location, and performs a work at the operation location.

16. The method of claim 11, wherein the robot includes a placing part where the commodities are to be placed, and
wherein a part of the robot that handles the commodities places the commodities on the placing part, and removes from the placing part the commodities placed on the placing part.

17. The method of claim 11, comprising remotely operating the robot by using a remote operation unit.

18. The method of claim 17, further comprising the steps of:

imaging, by an imaging unit, a situation around the robot; and displaying, by a display unit, the image captured by the imaging unit to an operator.

19. The method of claim 11, comprising program-controlling the robot.

20. The method of claim 11, wherein the commodities include a cargo, baggage, or relief supplies.

* * * * *